United States Patent Office 3,038,017
Patented June 5, 1962

3,038,017
DISTILLING ALKYLATE PRODUCT WITH
THIOPHENYLAMINE
George W. Ayers, Chicago, and William A. Krewer, Arlington Heights, Ill., assignors to Pure Oil Company, Chicago, Ill., a corporation of Ohio
No Drawing. Filed Dec. 15, 1959, Ser. No. 859,566
3 Claims. (Cl. 260—683.62)

This invention relates to the preparation of industrial odorless naphthas. More particularly, this invention relates to a two-step process for the preparation of industrial odorless naphthas involving the alkylation of an isoalkane under particular conditions to form an alkylate product, followed by distillation of the alkylate product in the presence of a small amount of an inhibitor to prevent the formation of odorous compounds during the distillation. A feature of this invention is the discovery that alkylate, prepared by the use of sulphuric acid containing an added phosphoric acid or phosphorus pentoxide as the alkylation catalyst, yields, upon fractional distillation of the alkylate product in the presence of an inhibitor, highly odorless mineral spirits boiling within the range of about 340° to 400° F. The resulting product has a notably better odor quality than the product produced from ordinary alkylate prepared without the presence of a phosphoric acid or phosphorus pentoxide, followed by distillation in the presence of an inhibitor, and is of higher odor quality than an alkylate prepared by steam and/or vacuum distillation (but with no inhibitor present) of ordinary alkylate, or even better than alkylate prepared using a combination of sulphuric acid and a phosphoric acid or phosphorus pentoxide as the alkylation catalyst without distillation in the presence of an inhibitor. The distillation step of this process in a continuous type of operation may include passage of the alkylate product through a fractionating column to remove the highly odorous hydrocarbon material boiling below about 340–350° F., (used in gasoline or aviation fuel blends), as the overhead product, and passage of the bottoms (heavy alkylate) from this first fractionating tower into a second fractionating tower wherein odorless mineral spirits or other odorless naphtha is removed as the overhead product. The inhibitor is preferably added to the alkylate product before passage through the first fractionating tower, and remains in the heavy alkylate as it is fed to the second tower. The inhibitor may, alternately, be added to the heavy alkylate before it is passed into the second tower, since it is in the second tower that alkylate components are most subject to conditions causing odor deterioration. Steam or other inert gas may be used in either or both of the fractionating towers. The passage of the alkylate product through the two fractionating towers may be interrupted, i.e., the bottoms from the first fractionating tower (heavy alkylate) may be stored for various periods of time before being reheated and charged to the second fractionating tower.

Odorless naphthas find application in many industrial services and processes because of their distinctive qualities and advantages, such as lack of odor, non-toxicity, good solvent properties, low cost and availability. Naphthas may be defined as hydrocarbon mixtures, usually of comparatively narrow boiling range, boiling below about 600° F. and derived from the fractional distillation of petroleum or of coal tar oils or from the fractional distillation of synthetic hydrocarbon products. Naphthas vary widely in their chemical and physical properties but may be classified as straight-run petroleum naphthas, aromatic naphthas, synthetic naphthas, etc., including alkylates, heavy alkylates, or fractions thereof. The present invention can be applied to the production of any paraffinic hydrocarbon alkylate product boiling below 600° F., and finds particular application in the case of alkylates formed from isoalkanes and one or more olefins, as are produced in the sulphuric acid alkylation process. The invention finds particular application for alkylation products from the reaction of isoalkanes, such as isobutane or isopentane, with one or more olefins, such as isobutylene or other butenes, for example, butene-1, butene-2 and diisobutylene.

Although naphthas consist essentially of mixtures of hydrocarbons, certain of the hydrocarbons may show slight instability or may exhibit oxidation or other transformation during fractional distillation. Moreover, various impurities such as organic oxygen compounds or other odorous substances may be present in small amounts in such naphthas after their preparation by fractional distillation of synthetic materials such as alkylates or heavy alkylates. The preparation of odorless naphthas, particularly naphthas of higher boiling range and heavy alkylate fractions which are free from odor and which remain odor-free during storage or use over extended periods of time, has been heretofore an uncertain and tedious operation. One batch of odorless naphtha may be satisfactory from the odor standpoint, while another batch prepared in apparently a similar operation may be wholly unsuitable as an odorless material.

There are many processes disclosed in the prior art which relate to the removal of odorous materials from hydrocarbon mixtures and naphthas. These are usually classified as sweetening processes where deleterious sulphur compounds are chemically modified, removed, or absorbed. For the purposes of the present invention, these prior art refining and sweetening methods, whether chemical or physical, when applied to essentially odorless heavy naphthas or alkylate fractions are generally found to be inadequate for the removal of odor, or the prevention of odor formation during distillation.

In accordance with this invention, it has been found that by preparing an alkylate in a particular manner, followed by distillation in the presence of certain inhibitors, the foregoing problems are overcome. The result herein is unexpected because there is no indication from the manner of alkylation or the manner of distillation that this two-step process will produce an unusually odor-free and stable product. It is to be understood that this invention does not relate to the removal of odor from naphthas or alkylates which have already decomposed to the point to be odorous, but rather is directed to the prevention of odor-formation during the distillation of those materials which are already essentially odor-free, but which have a decided tendency to go off odor during distillation or during storage, particularly synthetic naphthas from sulphuric acid alkylation processes. Consequently, those processes in the prior art which are concerned with chemical refining, adsorption, and sweetening, as applied to cracked naphthas or naphthas containing sulphur compounds which are notoriously odorous, have no bearing on the present invention.

Accordingly, it becomes a primary object of this invention to provide a process of preparing odorless, stable naphthas and alkylate fractions. Another object of this invention is to provide an odorless, stable alkylate fraction prepared by the sulphuric acid alkylation of an isoalkane hydrocarbon with one or more olefins, and distillation of the alkylate product in the presence of an inhibitor which may be an alkyl-substituted phenol, e.g., 2,6-di-tertiary-butyl-4-methylphenol, or an alkyl-substituted or unsubstituted thiodiphenylamine, e.g., phenothiazine.

Another object of this invention is to provide a process of preparing odorless, stable, alkylate hydrocarbons by alkylating an isoalkane hydrocarbon with one or more olefins in the presence of sulphuric acid and a phosphoric acid or phosphorus pentoxide, and distilling the alkylate product in the presence of an inhibitor selected from the group consisting of 2,6-di-tertiary-butyl-4-methylphenol and phenothiazine. Another object of this invention is to provide a process for the preparation of odorless, stable, alkylate hydrocarbons boiling in the range of about 340° to 600° F. by alkylating an isoalkane hydrocarbon with one or more olefins in the presence of sulphuric acid and phosphorus pentoxide, or a phosphoric acid, and distilling the alkylate product in the presence of an inhibitor selected from the group consisting of 2,6-di-tertiary-butyl-4-methylphenol and phenothiazine.

These and further objects of the invention will become apparent or be described as the specification proceeds.

The first step in the combination process of this invention is the alkylation of an isoalkane hydrocarbon with one or more olefins in the presence of an acid catalyst. The isoalkane hydrocarbon may be isobutane or isopentane, and the olefin may be propylene, isobutylene, butene-1, butene-2, or diisobutylene. The alkylation is carried out in the same manner as an ordinary sulphuric acid alkylation except that the catalyst is sulphuric acid to which has been added phosphorus pentoxide or a phosphoric acid. The catalyst may be prepared by adding up to one part of phosphorus pentoxide to six parts by weight of concentrated sulphuric acid, or by adding an essentially anhydrous phosphoric acid to concentrated sulphuric acid (e.g., 96%), or to sulphuric acid of 90 to 100% concentration. After the addition of the phosphorus pentoxide or phosphoric acid to the sulphuric acid, no further addition of the phosphorus pentoxide or phosphoric acid is necessary, and the alkylation acid so prepared may be used in successive alkylation reactions until it becomes spent. The spent alkylation acid can be regenerated by heating, with or without the addition of water, until organic matter has been oxidized or otherwise removed and the water content reduced to not more than about 10%, after which the catalyst can be used again for alkylation without further addition of phosphorus pentoxide or phosphoric acid.

If desired, aqueous phosphoric acid may be added to the sulphuric acid, or spent alkylation acid, and the mixture heated until the water content of the mixture is no greater than about 10%. After this, the catalyst may be used in the alkylation process. A preferred mode of operation comprises conducting the alkylation with an alkylation catalyst having a water content of less than about 5%, or even less than about 2%.

In conducting the alkylation using the afore-described alkylation catalyst composed of sulphuric acid and phosphorus pentoxide or a phosphoric acid, it has been found that, contrary to expectations, the process does not result in the formation of phosphate esters in the alkylate product. The presence of the added phosphorus pentoxide or phosphoric acid prevents the formation of odorous compounds in the portion of the alkylate boiling above about 340° F. This odor-prevention is particularly noticeable in the portion of the alkylate boiling above about 350° F. Some of the effect of the phosphorus pentoxide or phosphoric acid seems to be the inhibition of olefin polymerization, preventing the formation of higher-boiling olefins having distinct and tenacious odors. An added advantage is that the alkylation takes place more readily with sulphuric acid containing phosphorus pentoxide or phosphoric acid than with sulphuric acid alone.

The alkylation process is carried out by reacting isoparaffinic hydrocarbons having less than 6 carbon atoms per molecule with olefinic hydrocarbons of more than 2 and less than 9 carbon atoms per molecule, in the presence of a catalyst comprising a mixture of phosphoric and sulphuric acids in substantial proportions. The resulting products predominate in saturated, branched-chain alkanes boiling within the gasoline boiling range and substantially free from polymers. The reaction temperature is maintained at approximately 30° to 50° F., as for example, at about 40° F. The reaction may be carried out in the liquid phase where at temperatures in the neighborhood of 40° F. pressures somewhat above atmospheric pressure are used.

The alkylation catalyst mixture may consist of about 10 volumes of commercial syrupy phosphoric acid (86% to 90% aqueous solution of ortho phosphoric acid) and 90 volumes of commercial 98% sulphuric acid, for example. The following are some known acids of phosphorus which may be employed in connection with sulphuric acid to produce the mixed catalyst suitable for alkylation of the specified isoparaffins with olefins:

Metaphosphoric acid
Pyrophosphoric acid
Orthophosphoric acid

Of the phosphoric acids, the preferred acids are orthophosphoric acid and pyrophosphoric acid. The starting, olefin-containing fraction to be employed in the alkylation process may be derived from petroleum cracking operations. When the reaction is carried out in the liquid phase, it is preferable to maintain during the course of the reaction a concentration of isoparaffins greatly in excess of that quantity theoretically necessary to combine with the olefins. Thus, in continuous operation of the process, a mixture of isoparaffins and olefins in which the isoparaffin-olefin ratio is at least 6:1 and preferably at least 10:1 is contacted thoroughly, or even emulsified, with the catalyst. The presence of an excess of isoparaffins is necessary to prevent appreciable olefin polymerization instead of alkylation of the isoparaffins. The constant presence of an excess of isoparaffinic molecules increases the chances of an immediate, or substantially immediate, contact of an activated olefin with an activated isoparaffin molecule.

After the formation of the alkylate product, it is distilled to separate a bottoms fraction (heavy alkylate) boiling within the range about 340 to 600° F., in order to free same from low-boiling constituents. The resulting heavy alkylate is next treated to distillation in the presence of an alkyl-substituted phenol or thiodiphenylamine compound, e.g., 2,6-di-tertiarybutyl-4-methylphenol or phenothiazine, to inhibit the formation of odor-producing materials therein. The inhibitor may, alternately, be added to the alkylate product before distillation to obtain heavy alklate, in which case it remains in the heavy alkylate for use during fractionation of the latter. Distillation is carried out in an ordinary manner with steam and/or reduced pressures with small amounts of the inhibitor added. For example, the distillation may be conducted at pressures in the order of 1.0 to 300 mm. of mercury. Any known form of distillation apparatus may be used and it is not necessary to take any special precautions as to the materials of construction of the distillation apparatus. In carrying out the invention, an amount of 2,6-ditertiary-butyl-4-methylphenol, or phenothiazine or their mixtures, sufficient to prevent or inhibit formation of odorous compounds is used. For this purpose between about 0.1 to 250 lbs. of either inhibitor alone or their combination per 1000 bbls. of alkylate may be used. In general, however, small amounts ranging from about 1 to 50 lbs. of the inhibitor per 1000 bbls. of alkylate are used. The upper concentration limit is dictated only by the economics of the process. The preferred concentration of the inhibitor for use in the distillation of heavy alkylates, which are particularly difficult to distill without odor development, ranges from about 10 to 50 lbs. per thousand barrels of heavy alkylate.

The odor-prevention agents described herein are characterized by their chemical stability during the distillation and do not break down under the conditions of the alkylate distillation. Furthermore, they are essentially free from odor themselves and do not distill over with the alkylate. The distillation may be carried out with or without the use of steam or an inert gas, such as nitrogen.

The essentially odorless heavy alkylates that can be benefited by the application of this invention have initial boiling points of about 340° F. and the end boiling point may be as high as 600° F. Heavy alkylates coming within this boiling range are obtained by the foregoing two-step process. The heavy alkylate from the alkylation process is the bottom portion distilling above 340 to 350° F., resulting from the fractionation of the entire alkylate product. The following table gives the distillation characteristics of several heavy alkylates which may be used in the present invention.

washed with water until it was free of acid. A portion of the washed alkylate product, after the addition of approximately 50 lbs./1000 bbls. of 2,6-di-tertiary-butyl-4-methylphenol, was distilled under high vacuum, yielding a 350–400° F. fraction (temperature corrected to 760 mm. pressure) having no perceptible odor. This 350–400° F. fraction was of high odor quality, a marketable odorless mineral spirits.

Another portion of the washed alkylate product was distilled under high vacuum with no 2,6-di-tertiary-butyl-4-methylphenol present. The odor of the 350–400° F. fraction was very inferior to that obtained when 2,6-di-tertiary-butyl-4-methylphenol was present.

Tests on Representative Heavy Alkylates
[Distillation]

| API Grav. | IBP | 5% | 10% | 20% | 30% | 40% | 50% | 60% | 70% | 80% | 90% | 95% | E.P. | Percent Rec. | Percent Res. | Percent Loss | Odor |
|---|---|---|---|---|---|---|---|---|---|---|---|---|---|---|---|---|---|
| 51.4 | 372 | 378 | 380 | 382 | 385 | 388 | 392 | 397 | 408 | 425 | 481 | 540 | 573 | 99.0 | 1.0 | 0.0 | slight (essentially odorless) |
| 51.4 | 361 | 366 | 368 | 371 | 373 | 376 | 381 | 386 | 396 | 416 | 468 | 509 | 543 | 98.1 | 1.4 | 0.5 | Do. |
| 52.6 | 358 | 365 | 368 | 369 | 371 | 374 | 378 | 383 | 390 | 406 | 460 | 510 | 532 | 98.5 | 1.1 | 0.4 | Do. |

In order to illustrate the invention, the following specific examples are given:

EXAMPLE I

A modified alkylation catalyst was prepared by adding 50 grams of phosphorus pentoxide to 300 grams of 96.6 wt. percent sulfuric acid. This modified alkylation catalyst was stirred mechanically and maintained at approximately 32° F. while a mixture of 10 parts by volume of isobutane gas and one part by volume of isobutylene gas was passed through a sintered-glass disperser immersed in the acid. Liquid alkylate was formed with great ease. The alkylate product was separated from the acid and washed with water until it was free of acid. A portion of the washed alkylate product, after addition of approximately 50 lbs./1000 bbls. of 2,6-di-tertiary-butyl-4-methylphenol, was distilled under high vacuum, yielding a 350–400° F. fraction (temperature corrected to 760 mm. pressure) having no perceptible odor, qualifying as a marketable mineral spirits.

Another portion of the washed alkylate product was distilled under high vacuum with no 2,6-di-tertiary-butyl-4-methylphenol present. The odor of the 350–400° F. fraction was very inferior to that obtained when 2,6-di-tertiary-butyl-4-methylphenol was present.

EXAMPLE II

Alkylate prepared in a manner similar to that of Example I, except that 96.6 wt. percent sulfuric acid alone was used as the alkylation catalyst, was separated and washed with water until free of sulfuric acid. The distillation of portions of this alkylate product, either with or without the presence of 50 lbs./1000 bbls. of 2,6-di-tertiary-butyl-4-methylphenol, produced 350–400° F. fractions which were very inferior in odor quality to that produced using the modified alkylation catalyst, and using 2,6-di-tertiary-butyl-4-methylphenol during distillation.

EXAMPLE III

A modified alkylation catalyst was prepared by adding 20 grams of phosphorus pentoxide to 300 grams of 96.6 wt. percent sulfuric acid. This modified alkylation catalyst was stirred mechanically and maintained at approximately 32° F. while a mixture of 10 parts by volume of isobutane gas and one part by volume of isobutylene gas was passed through a sintered-glass disperser immersed in the acid. Liquid alkylate was formed with great ease. The alkylate product was separated from the acid and

EXAMPLE IV

When the process described in Example I is repeated using phenothiazine in place of the 2,6-di-tertiary-butyl-4-methylphenol, an odorless, marketable fraction boiling from about 350–400° F. is separated.

The inhibitors used may be selected from the group of:

Alkyl-substituted phenols, e.g.:
    2,6-di-tertiary-butyl-4-methylphenol
    2,6-di-tertiary-butlphenol
    2,4,6-tri-tertiary-butylphenol
    2,6-di-tertiary-octyl-4-methylphenol
    2,4,6-tri-tertiary-octylphenol
    2,6-di-tertiary-butyl-4-tertiary-octylphenol
    4,4'-methylene-bis (2,6-di-tert-butylphenol)
    4,4'-bis (2,6-di-tert-butylphenol)
    4,4'-methylene-bis (6-tert-butyl-o-cresol)
    2,6-di-tert-butyl-alpha-methoxy-p-cresol
Alkyl-substituted thiodiphenylamines, e.g.:
    1,1'-dimethylphenothiazine
    1,1'-diethylphenothiazine
Thiodiphenylamines, e.g.:
    Phenothiazine
    N-methylphenothiazine The embodiments of the invention in which an exclusive property or privilege is claimed are defined as follows.

We claim:
1. The process of preparing odorless, stable alkylate fractions comprising subjecting a reactive mixture of isoparaffinic and olefinic hydrocarbons to sulfuric acid alkylation at a temperature of about 30° to 50° F. in the presence of a phosphorus compound of the group consisting of phosphoric acids and phosphorus pentoxide, and distilling the alkylate product in the presence of thiodiphenylamine inhibitor.

2. The process of preparing odorless, stable, alkylate hydrocarbons boiling in the range of 340 to 600° F. which comprises alkylating isoalkane hydrocarbons with olefinic hydrocarbons at a temperature of about 30° to 50° F. in the presence of sulphuric acid and ortho phosphoric acid, distilling the alkylate product in the presence of an inhibitor comprising phenothiazine and separating an odorless stable product.

3. The process of preparing odorless, stable, alkylate hydrocarbons boiling in the range of 340 to 600° F.

which comprises alkylating isoalkane hydrocarbons with olefinic hydrocarbons at a temperature of about 30° to 50° F. in the presence of sulphuric acid and pyrophosphoric acid, distilling the alkylate product in the presence of an inhibitor comprising phenothiazine and separating an odorless stable product.

References Cited in the file of this patent

UNITED STATES PATENTS

| | | |
|---|---|---|
| 2,204,194 | Stahly et al. | June 11, 1940 |
| 2,359,542 | Bradley et al. | Oct. 3, 1944 |
| 2,851,506 | Ayers et al. | Sept. 9, 1958 |